(12) United States Patent
Onishi et al.

(10) Patent No.: US 10,419,702 B2
(45) Date of Patent: Sep. 17, 2019

(54) IMAGING APPARATUS, IMAGING SYSTEM, AND METHOD OF DRIVING AN IMAGING SYSTEM

(71) Applicant: CANON KABUSHIKI KAISHA, Tokyo (JP)

(72) Inventors: Tomoya Onishi, Ayase (JP); Shin Kikuchi, Isehara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/854,560

(22) Filed: Dec. 26, 2017

(65) Prior Publication Data

US 2018/0124346 A1 May 3, 2018

Related U.S. Application Data

(63) Continuation of application No. 14/813,485, filed on Jul. 30, 2015, now Pat. No. 9,894,308.

(30) Foreign Application Priority Data

Aug. 14, 2014 (JP) .................. 2014-165216

(51) Int. Cl.
*H04N 5/378* (2011.01)
*H04N 5/355* (2011.01)

(52) U.S. Cl.
CPC ............. *H04N 5/378* (2013.01); *H04N 5/355* (2013.01)

(58) Field of Classification Search
CPC ................................ H04N 5/378; H04N 5/355
See application file for complete search history.

(56) References Cited

U.S. PATENT DOCUMENTS

| 7,321,110 | B2 | 1/2008 | Okita |
| 7,408,210 | B2 | 8/2008 | Ogura |
| 7,460,162 | B2 | 12/2008 | Koizumi |
| 7,550,793 | B2 | 6/2009 | Itano |
| 7,554,591 | B2 | 6/2009 | Kikuchi |
| 7,907,196 | B2 | 3/2011 | Ogura |
| 8,045,034 | B2 | 10/2011 | Shibata |
| 8,174,600 | B2 | 5/2012 | Ogura |
| 8,310,576 | B2 | 11/2012 | Hashimoto |
| 8,379,124 | B2 | 2/2013 | Kikuchi |
| 8,507,870 | B2 | 8/2013 | Arishima |

(Continued)

FOREIGN PATENT DOCUMENTS

JP 2010-016416 1/2010

*Primary Examiner* — Albert H Cutler
(74) *Attorney, Agent, or Firm* — Venable LLP

(57) ABSTRACT

Provided is an imaging apparatus, including: a vertical scanning circuit configured to output the reset signal and the image signal sequentially from each of a plurality of pixels by selecting the plurality of pixels sequentially; and an amplifier unit configured to output a plurality of image signals obtained by amplifying one image signal that is output from one of the plurality of pixels at a plurality of gains including a first gain and a second gain, in which, in a reading period, which is a period between selection of a first pixel by the vertical scanning circuit out of the plurality of pixels and subsequent selection of a second pixel out of the plurality of pixels, a number of times the amplifier unit is reset is less than a number of the plurality of amplified image signals.

14 Claims, 10 Drawing Sheets

(56) References Cited

U.S. PATENT DOCUMENTS

| | | |
|---|---|---|
| 8,530,989 B2 | 9/2013 | Kikuchi |
| 8,605,178 B2 | 12/2013 | Kikuchi |
| 8,687,246 B2 | 4/2014 | Fujimura |
| 8,710,610 B2 | 4/2014 | Kono |
| 8,836,833 B2 | 9/2014 | Yamashita |
| 8,921,900 B2 | 12/2014 | Iida |
| 8,937,672 B2 | 1/2015 | Totsuka |
| 9,007,501 B2 | 4/2015 | Matsuda |
| 9,105,553 B2 | 8/2015 | Kikuchi |
| 9,124,833 B2 | 9/2015 | Toyoguchi |
| 9,142,575 B2 | 9/2015 | Kobayashi |
| 2005/0083120 A1 | 4/2005 | Roos |
| 2007/0165121 A1 | 7/2007 | Yamauchi |
| 2009/0322903 A1 | 12/2009 | Hashimoto |
| 2012/0008030 A1 | 1/2012 | Kono |
| 2012/0105695 A1 | 5/2012 | Iida |
| 2012/0286138 A1 | 11/2012 | Yamazaki |
| 2013/0162874 A1 | 6/2013 | Hashimoto |
| 2014/0054445 A1 | 2/2014 | Kikuchi |
| 2015/0319384 A1 | 11/2015 | Onishi |
| 2016/0037092 A1* | 2/2016 | Chae ................. H04N 5/378 348/300 |

* cited by examiner

IMAGING APPARATUS, IMAGING SYSTEM, AND METHOD OF DRIVING AN IMAGING SYSTEM

This application is a continuation of application Ser. No. 14/813,485, filed Jul. 30, 2015.

BACKGROUND OF THE INVENTION

Field of the Invention

The present invention relates to an imaging apparatus, an imaging system, and a method of driving an imaging system.

Description of the Related Art

There are described in Japanese Patent Application Laid-Open No. 2010-016416 an imaging apparatus that includes a plurality of pixels arranged in matrix and a column amplifier unit provided for each column of the plurality of pixels to output a pixel signal amplified by the column amplifier unit, and an imaging system that includes a signal processing unit for processing the output signal. The imaging system of Japanese Patent Application Laid-Open No. 2010-016416 is capable of amplifying, in the column amplifier unit, a signal output from a relevant pixel at a gain of q times, q being larger than 1, and subsequently multiplying, in the signal processing unit, the resultant image signal by a ratio smaller than 1.

When the quantity of incident light is small, the imaging system of Japanese Patent Application Laid-Open No. 2010-016416 can reduce the N component of the signal-to-noise (S/N) ratio by reducing input-referred noise (a value calculated by dividing noise that is generated downstream of the column amplifier unit by gain) through amplification at a gain of q times. When the quantity of incident light is large, the imaging system can prevent the output signal from saturating by reading at a gain p, which is smaller than q. The imaging system described in Japanese Patent Application Laid-Open No. 2010-016416 is thus capable of improving the S/N ratio and expanding the dynamic range.

A method of driving the imaging apparatus is also disclosed in Japanese Patent Application Laid-Open No. 2010-016416, which involves sequentially reading two signals that are varied from each other in gain. In a mode of the imaging apparatus described in Japanese Patent Application Laid-Open No. 2010-016416, output signals from the column amplifier unit are held sequentially in four holding capacitors (for example, FIG. 4 of Japanese Patent Application Laid-Open No. 2010-016416). The number of signals to be held is accordingly large, which gives rise to a problem of slow reading speed. Japanese Patent Application Laid-Open No. 2010-016416 also discloses, as another mode of the imaging apparatus, a configuration that includes two column amplifiers different from each other in gain to hold output signals in parallel in two pairs of holding capacitors. This configuration, however, requires two column amplifier units for one column of pixels, which gives rise to another problem in that the larger area taken up by the column amplifier units increases the chip area. Speeding up reading may therefore be difficult with this configuration in some cases.

SUMMARY OF THE INVENTION

According to one embodiment of the present invention, there is provided an imaging apparatus, including: a plurality of pixels arranged in matrix, each of the plurality of pixels being configured to output a reset signal being an output signal when the each of the plurality of pixels is reset, and an image signal being an output signal based on a quantity of incident light; a vertical scanning circuit configured to output the reset signal and the image signal sequentially from each of the plurality of pixels by selecting the plurality of pixels sequentially; and an amplifier unit configured to output a plurality of image signals obtained by amplifying one image signal that is output from one of the plurality of pixels at a plurality of gains including a first gain and a second gain, which has a different value from that of the first gain, in which, in a reading period, which is a period between selection of a first pixel by the vertical scanning circuit out of the plurality of pixels and subsequent selection of a second pixel out of the plurality of pixels, a number of times the amplifier unit is reset is less than a number of the plurality of amplified image signals.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Components having the same function are denoted by like reference symbols throughout the drawings, and descriptions of overlapping components are sometimes omitted.

First Embodiment

Figure 1:
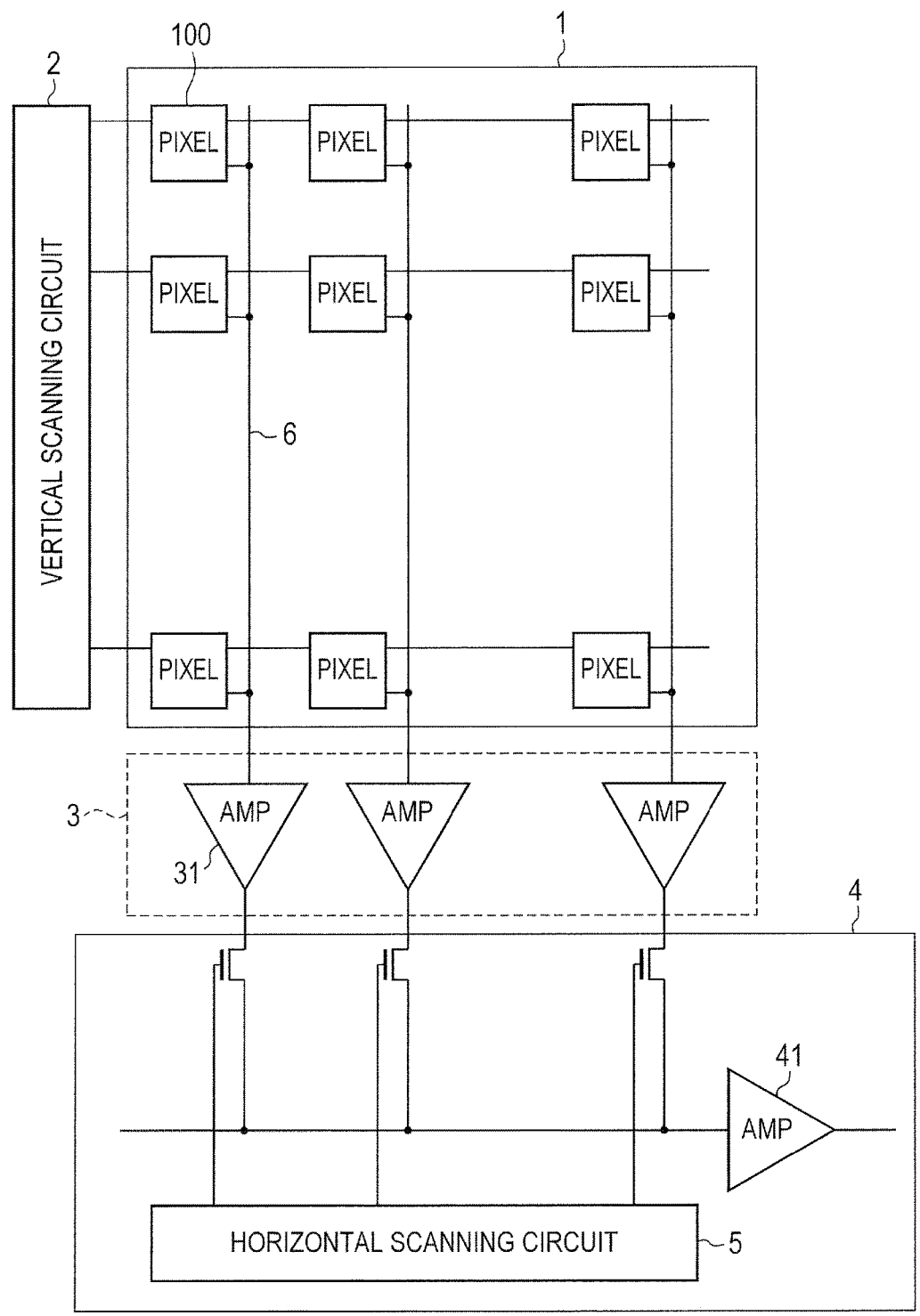
FIG. 1 is a diagram for illustrating an example of the configuration of an imaging apparatus according to a first embodiment of the present invention.

FIG. 1 is a block diagram for illustrating an example of an imaging apparatus according to a first embodiment of the present invention. The imaging apparatus of this embodiment includes an imaging area 1, a vertical scanning circuit 2, a column amplifier unit 3, and a horizontal transfer unit 4. The imaging area 1 has a pixel array in which a plurality of pixels 100 are arranged in matrix. The vertical scanning circuit 2 supplies a control signal for controlling transistors of the pixels 100 so that the transistors are turned on (a state in which main electrodes of the transistor are electrically connected) or off (a state in which main electrodes of the transistor are electrically disconnected). The imaging area 1 has vertical signal lines 6 for reading signals from the pixels 100 on a column-by-column basis. The column amplifier unit 3 has amplifying circuits 31, which are connected to the vertical signal lines of the respective columns to amplify signals from the pixels 100 of the respective columns. The horizontal transfer unit 4 includes switches connected to amplifiers of the respective columns, a horizontal scanning circuit 5, which supplies a control signal for controlling the switches to be on or off, and an amplifying circuit 41, which amplifies signals output from the amplifier circuits 31 of the respective columns. A signal output from the amplifying circuit 41 is input to an output signal processing unit (not shown) external to the imaging apparatus to execute analog-to-digital conversion, input data correction, and other types of processing.

The ratio of the absolute values of an input voltage and an output voltage, or the like, is expressed herein as "gain" even when the ratio is equal to or less than 1. Processing where the gain is equal to or less than 1 is included in "amplification" as well. In other words, what is generally called as "buffering" (the gain is approximately 1) or "attenuation" (the gain is less than 1) is included in "amplification".

Figure 2:
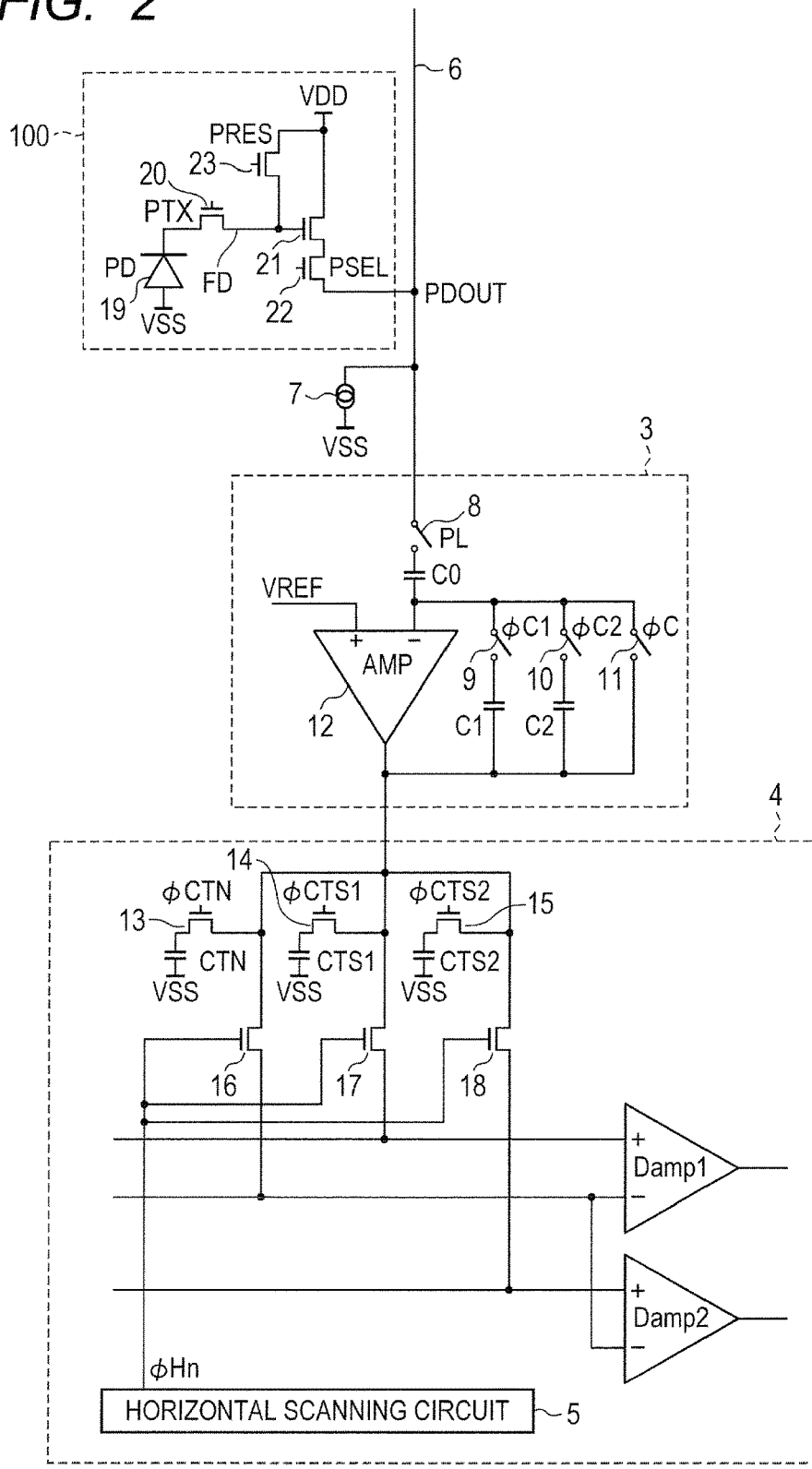
FIG. 2 is a more detailed diagram of the configuration of the imaging apparatus according to the first embodiment.

FIG. 2 is a more detailed diagram of the configurations of the pixels 100, the column amplifier unit 3, and the horizontal transfer unit 4 according to this embodiment. While the imaging area 1, the column amplifier unit 3, and the horizontal transfer unit 4 each include many elements as illustrated in FIG. 1, only one pixel 100, a portion of the column amplifier unit 3 that handles one column, and a portion of the horizontal transfer unit 4 that handles one column are illustrated in FIG. 2 for the sake of simplification.

The pixel 100 includes a photoelectric converter 19 and transistors 20, 21, 22, and 23. The photoelectric converter 19 is a photoelectric conversion element, such as a photodiode, which accumulates electric charges based on incident light. Each transistor may be a metal-oxide-semiconductor field effect transistor (MOSFET), or the like. Each transistor in this embodiment is an N-channel MOSFET.

The vertical scanning circuit 2 supplies signals PTX, PSEL, and PRES to a gate of the transistor 20, a gate of the transistor 22, and a gate of the transistor 23, respectively, to control the pixels 100 of the imaging area 1 on a row-by-row basis. The transistor 20 is connected between the photoelectric converter 19 and a gate of the transistor 21. When the signal PTX changes from the low level (hereinafter referred to as L level) to the high level (hereinafter referred to as H level), electric charges accumulated in the photoelectric converter 19 are transferred to and held in a floating diffusion portion FD, which is the gate of the transistor 21. A power supply voltage VDD is supplied to a drain of the transistor 21. A source of the transistor 21 is connected to a drain of the transistor 22, and a source of the transistor 22 is connected to one of the vertical signal lines 6. The transistor 21 thus functions as a source follower for outputting to the vertical signal line 6 a voltage that is in relation to electric charges transferred from the photoelectric converter 19. A current source 7 supplies to the vertical signal line 6 a bias current for reading a signal that is output from the pixel 100. When the signal PSEL input from the vertical scanning circuit 2 becomes the H level and the transistor 22 is turned on, a signal output from the transistor 21 is output to the vertical signal line 6. A signal that is output based on electric charges transferred from the photoelectric converter 19 in this manner is referred to as an image signal.

A source of the transistor 23 is connected to the gate of the transistor 21, and the power supply voltage VDD is supplied to a drain of the transistor 23. When the signal PRES input from the vertical scanning circuit 2 becomes the H level, the electric potential of the floating diffusion portion FD, which is the gate of the transistor 21, is reset to a voltage that is based on the power supply voltage VDD. After the electric potential of the floating diffusion portion FD is reset, a signal based on the reset electric potential is output to the vertical signal line 6. A signal that is output based on the reset electric potential of the floating diffusion portion FD at the time of resetting in this manner is referred to as a reset signal (N signal).

The column amplifier unit 3 is a circuit that amplifies a signal input from the vertical signal line 6 and outputs the amplified signal to the horizontal transfer unit 4. The column amplifier unit 3 includes switches 8, 9, 10, and 11, a column amplifier 12, and capacitors C0, C1, and C2. A timing generator (not shown) supplies a signal PL to the switch 8, supplies a signal ϕC1 to the switch 9, a signal ϕC2 to the switch 10, and a signal 4C to the switch 11 to control the switches 8 to 11 to be on or off, respectively. In the following description, each switch is switched on when a signal input to the switch is at the H level, and is switched off when the input signal is at the L level. The term "switch" herein means a device that switches between on and off based on an externally input signal, and is, for example, a transistor. Each switch in the following description as well as each transistor is an N-channel MOSFET.

The column amplifier 12 is a differential amplifier such as an operational amplifier. The column amplifier 12 in the following description is a differential amplifier that has a non-inverting input terminal, an inverting input terminal, and an output terminal. A signal from the vertical signal line 6 is input to the inverting input terminal of the column amplifier 12 via the switch 8 and the capacitor C0. A feedback circuit that includes the switches 9, 10, and 11 and the capacitors C1 and C2 is connected between the inverting input terminal and output terminal of the column amplifier 12. One terminal of the switch 9 is connected to the inverting input terminal of the column amplifier 12, and the other terminal of the switch 9 is connected to one terminal of the capacitor C1. The other terminal of the capacitor C1 is connected to the output terminal of the column amplifier 12. Similarly, one terminal of the switch 10 is connected to the inverting input terminal of the column amplifier 12, and the other terminal of the switch 10 is connected to one terminal of the capacitor C2. The other terminal of the capacitor C2 is connected to the output terminal of the column amplifier 12. The switch 11 is connected between the inverting input terminal and output terminal of the column amplifier 12. A reference voltage VREF is input to the non-inverting input terminal of the column amplifier 12.

The gain of the column amplifier unit 3 is set based on the capacitance ratio of the capacitor C0 and the capacitor C1

(C0/C1), or the capacitance ratio of the capacitor C0 and the capacitor C2 (C0/C2). In this embodiment, a first gain G1 and second gain G2 of the column amplifier unit 3 can be set to four and one, respectively, for example. In other words, the gain G1 and the gain G2 can have values different from each other. The gain G1 and the gain G2, however, are not limited thereto. Selection between the gain G1 and the gain G2 is made by switching one of the switch 9 and the switch 10 on and selecting one of the capacitor C1 and the capacitor C2 as a feedback capacitor.

The switch 11 is for switching connection or disconnection between the inverting input terminal and output terminal of the column amplifier 12, between the terminals of the capacitor C1, and between the terminals of the capacitor C2 when the column amplifier 12 is reset. The capacitor C0, the column amplifier 12, the switch 11, and others function as a first correlated double sampling (CDS) circuit.

The horizontal transfer unit 4 includes switches 13, 14, and 15, capacitors CTN, CTS1, and CTS2, switches 16, 17, and 18, the horizontal scanning circuit 5, and output amplifiers Damp1 and Damp2. A timing generator (not shown) supplies a signal φCTN to the switch 13, supplies a signal φCTS1 to the switch 14, and supplies a signal φCTS2 to the switch 15 to control the switches 13, 14, and 15 on or off, respectively. The switches 13, 14, and 15 are each connected at one terminal to the output terminal of the column amplifier 12, and are connected at the other terminal to one terminal of the capacitor CTN, one terminal of the capacitor CTS1, and one terminal of the capacitor CTS2, respectively. The other terminal of the capacitor CTN, the other terminal of the capacitor CTS1, and the other terminal of the capacitor CTS2 are at an electric potential VSS. The electric potential VSS is given by, for example, connecting to a well. Each of the switches and each of the capacitors thus form a holding circuit for temporarily holding the input signal voltage of a reset signal, an image signal, or other signals that are input. In other words, signals output from the column amplifier 12 can be sampled and held in the capacitors CTN, CTS1, and CTS2 by switching electrical connection of the switches 13, 14, and 15. The capacitor CTN holds a reset signal that is based on the reset electric potential of the floating diffusion portion FD. The capacitor CTS1 and the capacitor CTS2 each hold an image signal that is based on the quantity of incident light.

The switches 16, 17, and 18 are connected at one terminal to terminals of the switches 13, 14, and 15 that are connected to the output terminal of the column amplifier 12. The horizontal scanning circuit 5 supplies a signal φHn to the switches 16, 17, and 18 for each column, where the column amplifier 12 is provided, separately to control the switching on or off of the switches 16, 17, and 18. The horizontal scanning circuit 5 executes horizontal scanning by switching on the switches 16, 17, and 18 one column at a time.

When the horizontal scanning circuit 5 controls the switches 16, 17, and 18 to be electrically connected, signals held in the capacitors CTN, CTS1, and CTS2 are input to the output amplifiers Damp1 and Damp2. The output amplifiers Damp1 and Damp2 are each a differential amplifier that includes a non-inverting input terminal, an inverting input terminal, and an output terminal, as is the column amplifier 12. The switch 17 is connected to the non-inverting input terminal of the output amplifier Damp1, and the switch 18 is connected to the non-inverting input terminal of the output amplifier Damp2. The switch 16 is connected to the inverting input terminals of the output amplifiers Damp1 and Damp2 both. The output amplifiers Damp1 and Damp2 output signals to the output signal processing unit (not shown), which is connected to the imaging apparatus. The output amplifier Damp1 outputs a difference between a signal held in the capacitor CTS1 and a signal held in the capacitor CTN. The output amplifier Damp2 outputs a difference between a signal held in the capacitor CTS2 and a signal held in the capacitor CTN. A circuit that includes the capacitors CTN, CTS1, and CTS2 and the output amplifiers Damp1 and Damp2 functions as a second CDS circuit. The second CDS circuit reduces an offset voltage that is caused by a change in the gain of the column amplifier unit 3.

Figure 3:
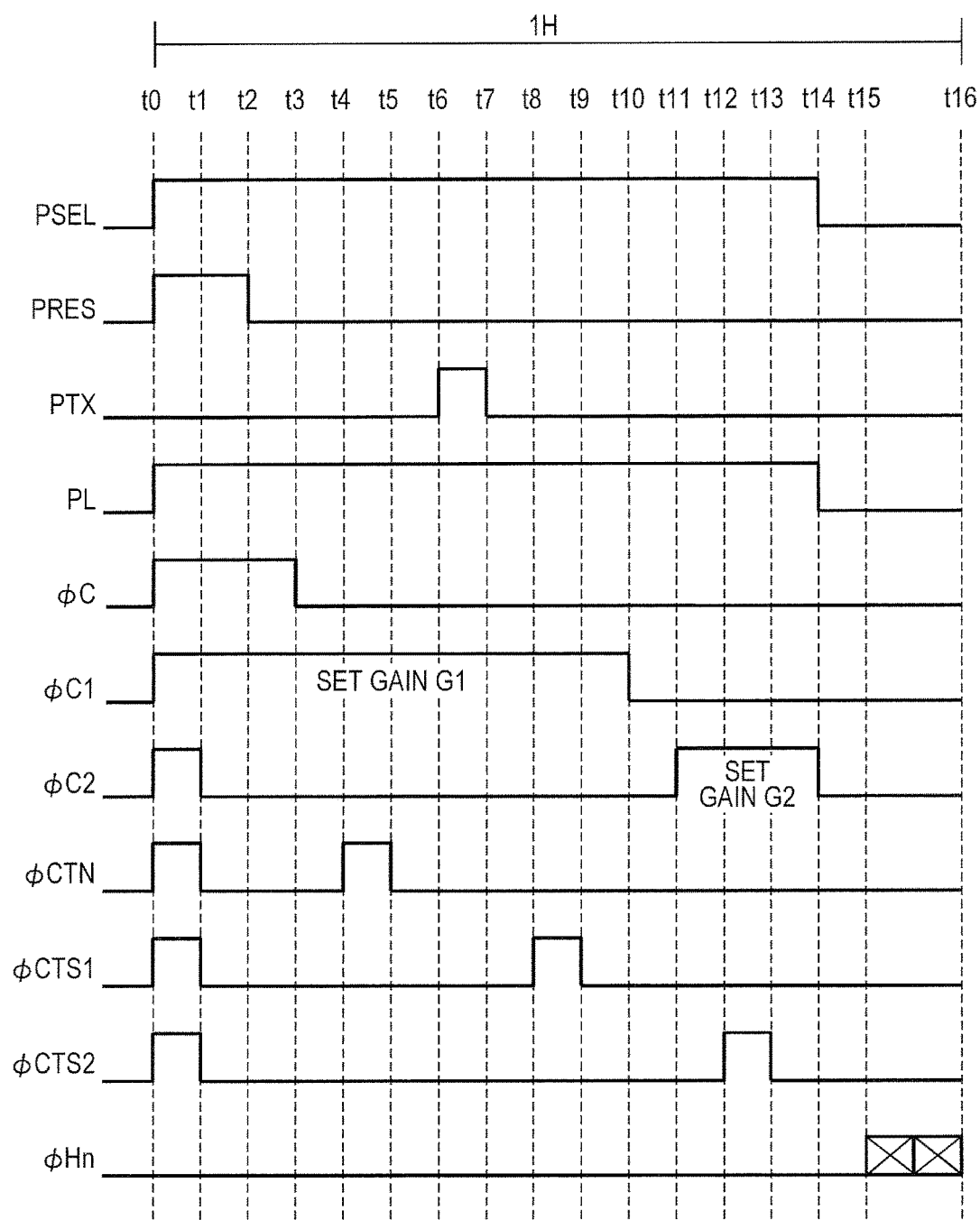
FIG. 3 is a timing chart for illustrating an example of the operation of the imaging apparatus according to the first embodiment.

FIG. 3 is a timing chart for illustrating the operation of the imaging apparatus of FIG. 1 and FIG. 2 in one reading period, where signals are read out from one pixels. The operation of the imaging apparatus of this embodiment is described below with reference to the timing chart of FIG. 3, as well as FIG. 1 and FIG. 2. The vertical scanning circuit 2 selects the plurality of pixels 100 one row at a time as described above, and the operation illustrated in the timing chart of FIG. 3 is executed row by row. The description given here focuses on a reading period for reading one row (1H), which is a period between the selection of one row of pixels by the vertical scanning circuit 2 out of the plurality of pixels 100 included in the imaging area 1 and the subsequent selection of another row of pixels.

At a time t0, the signal PTX output from the vertical scanning circuit 2 is at the L level. In other words, the transistor 20 is turned off, and the photoelectric converter 19 and the floating diffusion portion FD are not electrically connected to each other.

The signal PRES output from the vertical scanning circuit 2 is at the H level. This resets the electric potential of the floating diffusion portion FD in each pixel 100. The signal PSEL output from the vertical scanning circuit 2 is also at the H level. The transistor thus outputs a signal that is based on the reset electric potential of the floating diffusion portion FD to the relevant vertical signal line 6 via the transistor 22.

The signal PL that is output from the timing generator (not shown) at the time t0 is at the H level. The switch 8 thus becomes connection state, with the result that a voltage of the vertical signal line 6 is input to the column amplifier 12 via the capacitor C0.

The signal φC, the signal φC1, and the signal φC2 are also at the H level. This connects the inverting input terminal and output terminal of the column amplifier 12 to each other, thereby making the column amplifier 12 a voltage follower. This also gives the same electric potential to the terminals of the capacitor C1 and the terminals of the capacitor C2, thereby resetting electric charges that have been accumulated in the capacitors C1 and C2.

The signal φCTN, the signal φCTS1, and the signal φCTS2 are also at the H level. The capacitors CTN, CTS1, and CTS2 of the horizontal transfer unit 4 are thus reset to an electric potential that is set with the output electric potential of the column amplifier 12 as a reference.

At a time t1, the signal φC2 output from the timing generator (not shown) changes to the L level, and the capacitor C2 is disconnected from the inverting input terminal of the column amplifier 12. In other words, the capacitor C1 is selected as the feedback capacitor and the gain of the column amplifier 12 is switched to G1.

The signal φCTN, the signal φCTS1, and the signal φCTS2 also change to the L level. This cancels the resetting of the capacitors CTN, CTS1, and CTS2.

At a time t2, the signal PRES changes to the L level. This cancels the resetting of the electric potential of the floating diffusion portion FD. The floating diffusion portion FD at this point holds an electric potential in which reset noise (kTC noise) is mixed. An output signal from the pixel 100 that is based on the reset noise is a reset signal. With the column amplifier 12 behaving as a voltage follower as described above, an electric potential corresponding to the reset signal is clamped to the capacitor C0 by the reference voltage VREF.

At a time t3, the signal φC changes to the L level. This cancels the resetting.

At a time t4, the signal φCTN changes to the H level, and a reset signal that is amplified and output by the column amplifier 12 is applied to the capacitor CTN. At a subsequent time t5, the signal φCTN changes to the L level and the amplified reset signal is sampled and held in the capacitor CTN. The reset noise component contained in the reset signal is subtracted by the voltage clamped to the capacitor C0 before the reset signal is output from the column amplifier 12. Accordingly, a signal held in the capacitor CTN contains mainly an offset voltage of the column amplifier 12 when the gain is G1.

The signal PTX changes to the H level at a time t6 and then changes to the L level at a time t7. This causes the transistor 20 to transfer electric charges that have been accumulated in the photoelectric converter 19 to the floating diffusion portion FD. The transistor 21 outputs an image signal that is based on the electric charges transferred to the floating diffusion portion FD to the vertical signal line 6 via the transistor 22. From the image signal amplified and output by the column amplifier 12 at this point, the reset signal has been subtracted by the first CDS circuit.

The signal φCTS1 changes to the H level at a time t8 and then changes to the L level at a time t9. This causes the capacitor CTS1 to sample and hold the image signal output from the column amplifier 12.

The signal φC1 changes to the L level at a time t10 and, thereafter, the signal φC2 changes to the H level at a time t11. This switches the feedback capacitor of the column amplifier 12 from the capacitor C1 to the capacitor C2, and switches the gain of the column amplifier unit 3 to G2. The signal input to the column amplifier 12 remains the same and a difference in the signal output from the column amplifier 12 is therefore due to the switching of the gain of the column amplifier unit 3 from G1 to G2.

The signal φCTS2 changes to the H level at a time t12 and then changes to the L level at a time t13. This causes the capacitor CTS2 to sample and hold an image signal that is an optical signal amplified at the gain G2 and output by the column amplifier 12.

At a time t14, the signal PSEL changes to the L level and the pixel 100 is disconnected from the vertical signal line 6. The signal PL also changes to the L level at the time t14, thereby disconnecting the column amplifier 12 from the vertical signal line 6. The signal φ2 changes to the L level at the time t14 as well, and the column amplifier 12 ceases the amplification operation.

In a period between a time t15 and a time t16, the horizontal scanning circuit 5 starts the operation of the signal φHn and executes horizontal scanning in which the switches 16, 17, and 18 are switched on one column at a time. This causes the output amplifier Damp1 to sequentially output, to the outside, signals each of which is based on the difference between a signal held in the capacitor CTN and a signal held in the capacitor CTS1, and causes the output amplifier Damp2 to sequentially output, to the outside, signals each of which is based on the difference between a signal held in the capacitor CTN and a signal held in the capacitor CTS2. A signal output from the output amplifier Damp1 and a signal output from the output amplifier Damp2 are a signal S1 and a signal S2, respectively.

The output signal S1 of the output amplifier Damp1 is a signal from which an offset component of the column amplifier unit 3 when the gain is G1 has been subtracted by the second CDS circuit. In the output signal S2 of the output amplifier Damp2, on the other hand, the difference between an offset component of the column amplifier unit 3 when the gain is G2 and the offset component of the column amplifier unit 3 when the gain is G1 remains as an offset component.

In the imaging apparatus driving method of this embodiment, the column amplifier unit 3 is reset once and an output signal in the reset state is held in the capacitor CTN as described above. The gain of the column amplifier unit 3 at this point is G1 (four in this embodiment), and the signal held in the capacitor CTN has therefore been amplified at the gain G1. Thereafter, an image signal amplified at the gain G1 and an image signal amplified at the gain G2 (one in this embodiment) are held in the capacitor CTS1 and the capacitor CTS2, respectively. The output amplifier Damp1 and the output amplifier Damp2 output a signal that is obtained by subtracting the signal held in the capacitor CTN from the signal held in the capacitor CTS1 and a signal that is obtained by subtracting the signal held in the capacitor CTN from the signal held in the capacitor CTS2 as the signal S1 and the signal S2, respectively. More options for the gain at which an image signal is amplified may be set so that the gain has three or more values. In this case, the number of output amplifiers is increased in proportion to the number of values that the gain can take.

In this embodiment, the number of times the column amplifier unit 3 is reset is less than the number of image signals that are output. The number of times of resetting is thus reduced and reading is finished quickly as a result. The number of times of resetting, which is one in the example described above, may be two or more as long as the number of times of resetting is smaller than the number of output image signals. However, resetting only once is most effective for speeding up reading and is accordingly preferred.

With the configuration of this embodiment, the dynamic range can be expanded by using a plurality of image signals amplified at a gain that is varied depending on the quantity of incident light. A signal processing method for accomplishing this is described with reference to FIG. 4A, FIG. 4B, and FIG. 4C.

Figure 4A:
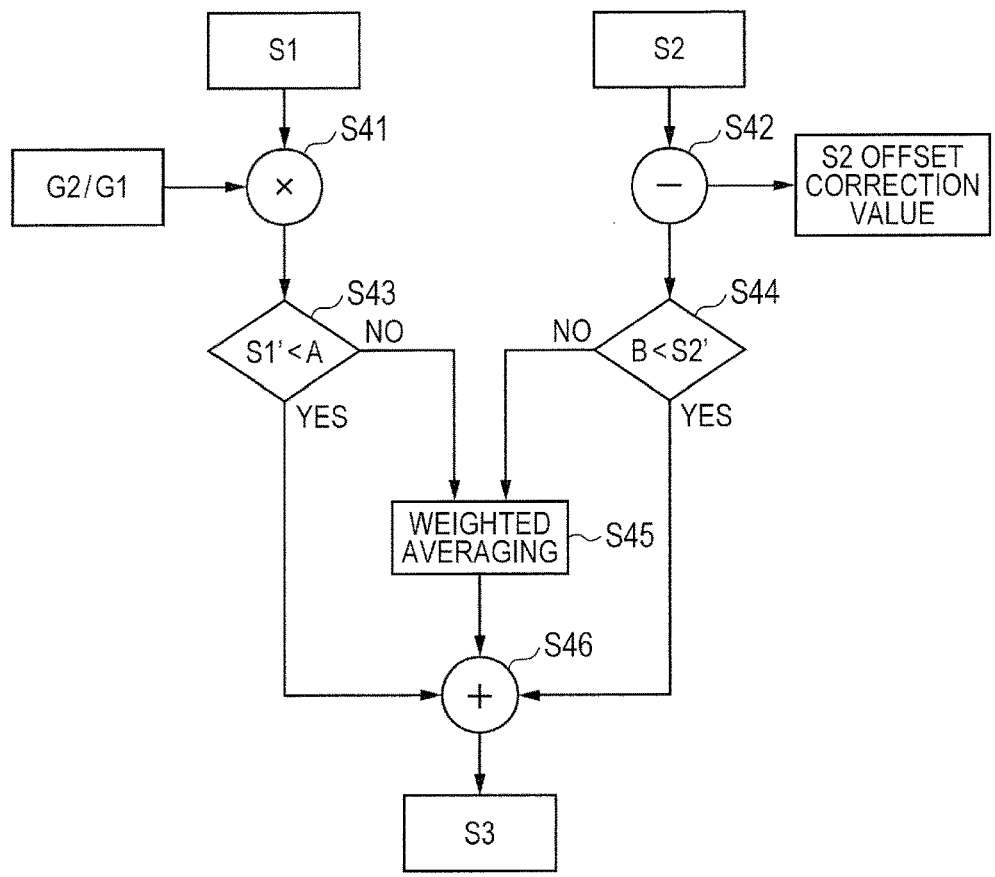
FIG. 4A is a schematic diagram for illustrating a signal processing method in which a signal with an expanded dynamic range is obtained from two signals.
Figure 4B:
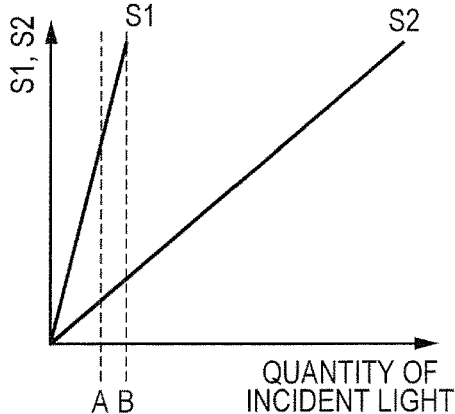
FIG. 4B is a graph for illustrating the magnitudes of signal voltages of a signal S1 and a signal S2 in relation to the quantity of incident light.

FIG. 4B is a graph for illustrating the magnitudes of the signal voltages of the signal S1 and the signal S2 in relation to the quantity of incident light. As illustrated in FIG. 4B, when the gain G1 is larger than the gain G2 and the quantity of incident light is the same, the signal S1 has a larger output value. The signal S1, which saturates at a smaller quantity of light than the signal S2, is low in the upper limit to the detectable quantity of light. However, because the signal S1 is amplified by the column amplifier unit 3 at a relatively high amplification ratio, the noise component contained in the signal S1 is mainly one that is generated in the pixel 100, and has a small proportion of noise that is generated downstream of the column amplifier unit 3. The signal S2, on the other hand, is amplified at a relatively low amplification ratio, and the proportion of noise that is generated downstream of the column amplifier unit 3 to the noise component contained in the signal S2 is therefore larger than the proportion thereof to the noise component contained in the signal S1. However, the signal S2 has a high upper limit to the detectable quantity of light. For those reasons, the signal S1 and the signal S2 have different ranges of the quantity of incident light that can be detected with excellent precision, and a signal with an expanded dynamic range can accordingly be obtained by combining the signal S1 and the signal S2.

A signal processing method for obtaining an output signal that has an expanded dynamic range from the signal S1 and the signal S2 is described with reference to FIG. 4A. This signal processing method can be executed by, for example, an output signal processing unit that is provided downstream of the output amplifiers Damp1 and Damp2. The signals S1 and S2 output from the output amplifiers Damp1 and Damp2 are analog signals as described above. The signal processing method includes calculation such as addition, subtraction, and multiplication performed on the signals S1 and S2. The calculation may be performed after the signals S1 and S2 are converted into digital data by an analog-to-digital conversion circuit, or may be performed with the use of an arithmetic circuit or the like when the signals S1 and S2 are still analog signals.

First, the output signal processing unit obtains the signals S1 and S2, which are in relation to the quantity of incident light, from the output amplifiers Damp1 and Damp2.

As described above, the gain of the column amplifier unit 3 that is used when the signal S1 is read is G1 and the gain used when the signal S2 is read is G2. The signal S1 is multiplied by a gain ratio G2/G1, which is obtained by dividing the gain G2 by the gain G1, to obtain a signal S1' (Step S41). This makes the gradient of an output signal-incident light quantity line substantially the same for the signal S1' and the signal S2.

The difference between the offset component of the column amplifier unit 3 when the gain is G2 and the offset component of the column amplifier unit 3 when the gain is G1 remains as an offset component in the output signal S2 of the output amplifier Damp2 as described above. An S2 offset correction value is therefore subtracted from the signal S2 to obtain a signal S2' (Step S42). The thus obtained signal S2' is reduced in offset component. The S2 offset correction value can be a value that is obtained in advance by measuring in advance the offset component of the column amplifier unit 3 when the gain is G2 and the offset component of the column amplifier unit 3 when the gains is G1 and holding the difference between the two in a storage medium.

A method of combining those two signals, S1' and S2', is described next. The signal S1' and signal S2' obtained by the calculation described above may not match each other completely in gradient or in offset. When this is the case, if the signals are combined by a simple method in which one of the signal S1' and the signal S2' is selected depending on the range of the quantity of incident light, discontinuity between the signal S1' and the signal S2' is observed around a border to the range of the quantity of incident light, and can be a cause of deterioration in image quality. Processing of connecting the signal S1' and the signal S2' continuously to combine the signals is therefore needed.

Figure 4C:
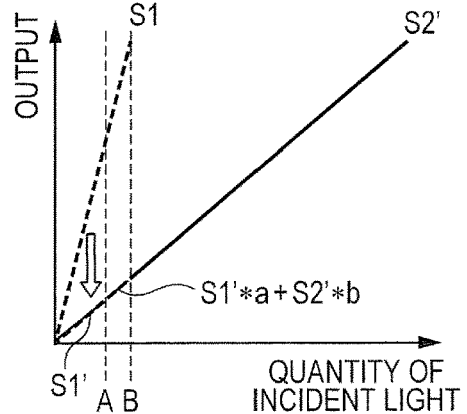
FIG. 4C is a graph for illustrating the combining of a signal S1' and a signal S2' through weighted averaging.

Accordingly, the signal S1' and the signal S2' are combined continuously by performing weighted averaging in a range of from an incident light quantity A to an incident light quantity B as shown in FIG. 4C, instead of combining the signal S1' and the signal S2' at one point. Specifically, the signal S1' is selected in a range where the quantity of incident light is smaller than A (Step S43), and the signal S2' is selected in a range where the quantity of incident light is larger than B (Step S44). In a range between those ranges, namely, a range where "A quantity of incident light B" is satisfied, weighted averaging of S1' and S2' is performed (Step S45). In the manner described above, a signal S3 generated by selection or weighted averaging depending on the zone of the quantity of incident light is output (Step S46). When the quantity of incident light is given as I, the output signal S3 in the range where "A≤quantity of incident light≤B" is satisfied is expressed by the following expression:

$$S3=S1'\times a+S2'\times b$$

where
$a=(B-I)/(B-A)$
$b=1-a$

The method of combining the signal S1' and the signal S2' is not limited thereto, and other methods can be used as long as the signal S1' and the signal S2' can be connected continuously. For example, the coefficients a and b may be set in accordance with a lookup table that is defined in advance.

Through this processing, noise that is generated downstream of the column amplifier unit 3 is reduced by using the signal S1, which is amplified at the large gain G1, for a signal that is small in the quantity of input light. A signal having an S/N ratio large enough to obtain an image can therefore be obtained. For a signal that is relatively large in the quantity of input light, on the other hand, the signal S2 amplified at the relatively small gain G2 is used to ensure that an adequate signal is obtained without saturation even when the quantity of light is large. In this case, although there is a chance that noise generated downstream of the column amplifier unit 3 is mixed in, a signal having an S/N ratio large enough to obtain an image can be obtained because the signal strength is high. A signal having a sufficient S/N ratio can thus be obtained in a wide range of the quantity of input light, and the dynamic range is accordingly expanded.

In the first embodiment of the present invention, the column amplifier unit 3 is reset once and the number of image signals, which is based on the number of different gains, here, G1 and G2, is two (the signal S1 and the signal S2). Because the number of times of resetting is lower than in the configuration of Japanese Patent Application Laid-Open No. 2010-016416, the time required to read signals is reduced and the speed of reading is enhanced. Although the number of times of resetting is reduced, through the use of a plurality of gains, here, G1 and G2, the first embodiment has an effect in that the S/N ratio of the imaging system is improved and in that the dynamic range is expanded.

While only one of the capacitor C1 and the capacitor C2, which are provided in the column amplifier unit 3, is used to determine which of the gain G1 and the gain G2 is to be set in this embodiment, the switches 9 and connected to the capacitors C1 and C2 may both be switched on to set the gain. This way, the gain can be selected from more options.

Second Embodiment

An imaging apparatus according to a second embodiment of the present invention is described by focusing on differences from the first embodiment.

Figure 5:
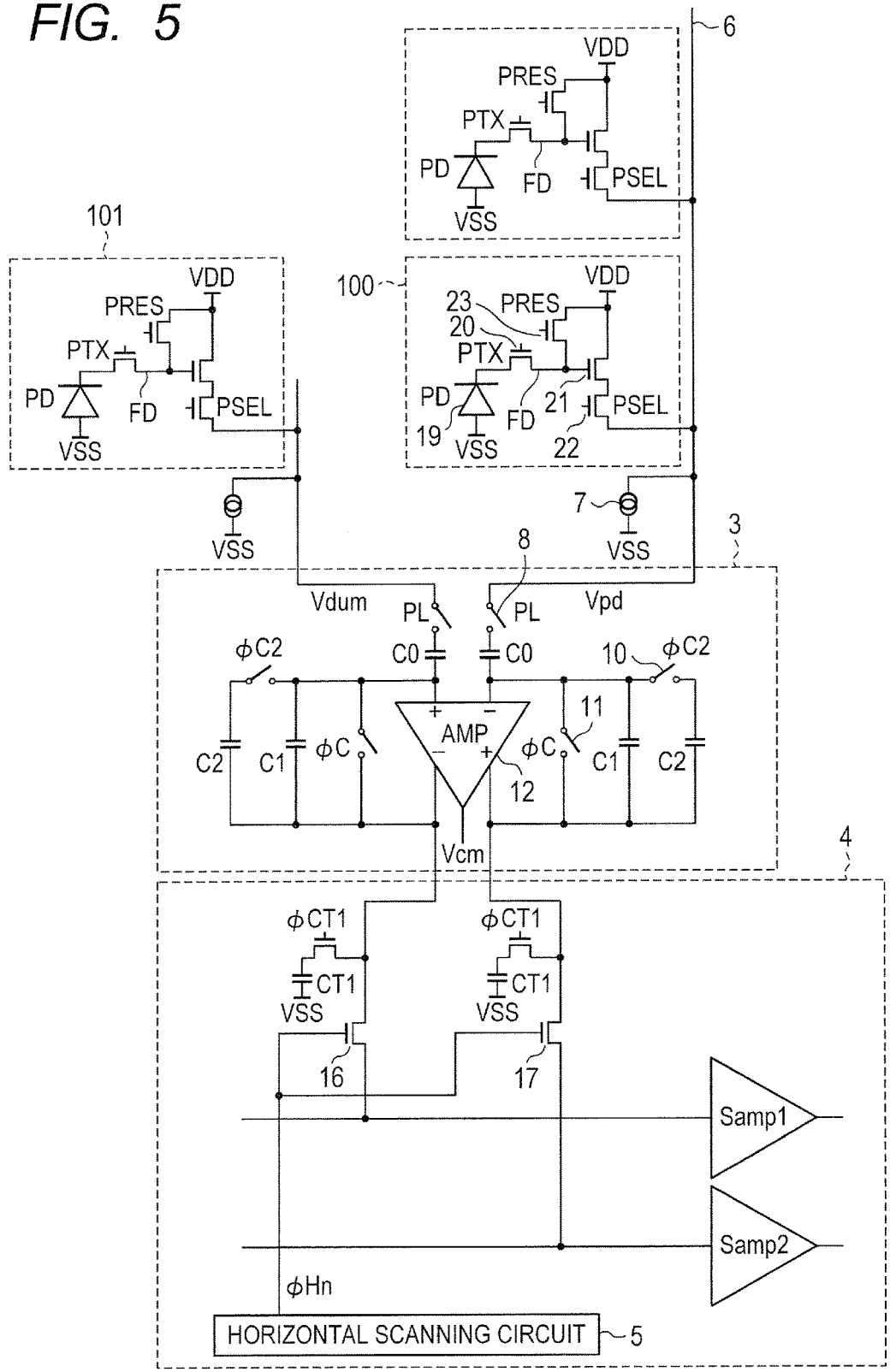
FIG. 5 is a diagram for illustrating an example of the configuration of an imaging apparatus according to a second embodiment of the present invention.

FIG. 5 is a diagram for illustrating the configuration of the imaging apparatus of this embodiment.

In this embodiment, a fully-differential-type differential amplifier (hereinafter referred to as fully-differential amplifier) having a differential input terminal and a differential output terminal is used as the column amplifier 12. Using a fully-differential amplifier improves the common mode rejection ratio (CMRR) and a power supply rejection ratio (PSRR). A fully-differential amplifier also allows for control of an output common mode voltage by inputting a common mode voltage Vcm.

While the reference voltage VREF is input to the non-inverting input terminal of the column amplifier 12 in the first embodiment, a reference pixel 101 is connected to the non-inverting input terminal of the column amplifier 12 in this embodiment. The reference pixel 101 has the same configuration as that of each pixel 100 except for the photoelectric converter 19. The photoelectric converter 19 of the reference pixel 101 is provided with a light shielding film such as a metal film, which is placed above a photoelectric conversion element such as a photodiode, in order to prevent light from entering the photoelectric conversion element. A pixel shielded against light as this is referred to as a light-shielded pixel or an optical black (OB) pixel. A light-shielded pixel outputs a signal equivalent to incident light when there is no incident light, and can therefore be used as a reference voltage source. The photoelectric converter 19 may also be configured so as to be connected to a well that has the electric potential VSS, instead of creating a photodiode in the photoelectric converter 19.

When a fluctuation in the power supply voltage VDD or noise such as switching noise from a switch provided in the pixel mixes in a signal, the noise acts as common mode noise to the pixel 100 and the reference pixel 101 both. Common mode noise due to the factors given above and other factors is reduced because a fully-differential amplifier reduces the common mode component of noise.

Differences in the feedback circuit configuration of the column amplifier unit 3 are described next. In the first embodiment, a feedback circuit is connected between the inverting input terminal and output terminal of the column amplifier 12. In this embodiment, in contrast, the same feedback circuit is connected between the inverting input terminal of the column amplifier 12 and a non-inverting output terminal of the column amplifier 12 and between the non-inverting input terminal of the column amplifier 12 and an inverting output terminal of the column amplifier 12 each.

In the feedback circuit of the first embodiment, the switch 9 is connected in series to the capacitor C1 and the switch 10 is connected in series to the capacitor C2. In this embodiment, in contrast, the switch 9 is not provided, and the switch 10 is connected between one terminal of the capacitor C2 and a node to which an input terminal of the column amplifier 12, one terminal of the capacitor C0, one terminal of the capacitor C1, and one terminal of the switch 11 are connected. The feedback capacitor is thus configured so that the capacitance of the feedback capacitor is C1 when the switch 10 is switched off and is (C1+C2) when the switch 10 is switched on. In other words, the gain G1, which is used when the switch 10 is switched off, is set based on a capacitance ratio (C0/C1) and the gain G2, which is used when the switch 10 is switched on, is set based on a capacitance ratio (C0/(C1+C2)).

In this embodiment, the circuit symmetry is improved by using a fully-differential amplifier as the column amplifier 12. Generated noise, such as switching noise, which is generated in each switch when the switch is put into operation, is therefore symmetrical between differential circuits. For example, when the switch 10, which controls the feedback capacitor of the column amplifier unit 3, is switched off, electric charges accumulated under a gate of the transistor that forms the switch 10 move toward the capacitor C0 and toward the capacitor C1 separately. The electric charges moving toward the capacitor C2 are accumulated in the capacitor C2 and change the voltage between the terminals of the capacitor C2. In the case of an asymmetrical circuit as in the first embodiment, a change in the voltage between the terminals of the capacitor C2 can cause a fluctuation in offset voltage, noise, and the like. In this embodiment, on the other hand, the use of a fully-differential amplifier makes a circuit on the reference voltage input side and a circuit on the signal input side symmetrical with each other, and the electric charges are accordingly generated symmetrically as well. Because common mode noise due to a voltage fluctuation as this is reduced, a fluctuation in offset voltage or noise switching or the like in the circuits of this embodiment may be reduced.

In this embodiment, single-ended output amplifiers Samp1 and Samp2 are used as amplifying circuits of the horizontal transfer unit 4.

Figure 6:
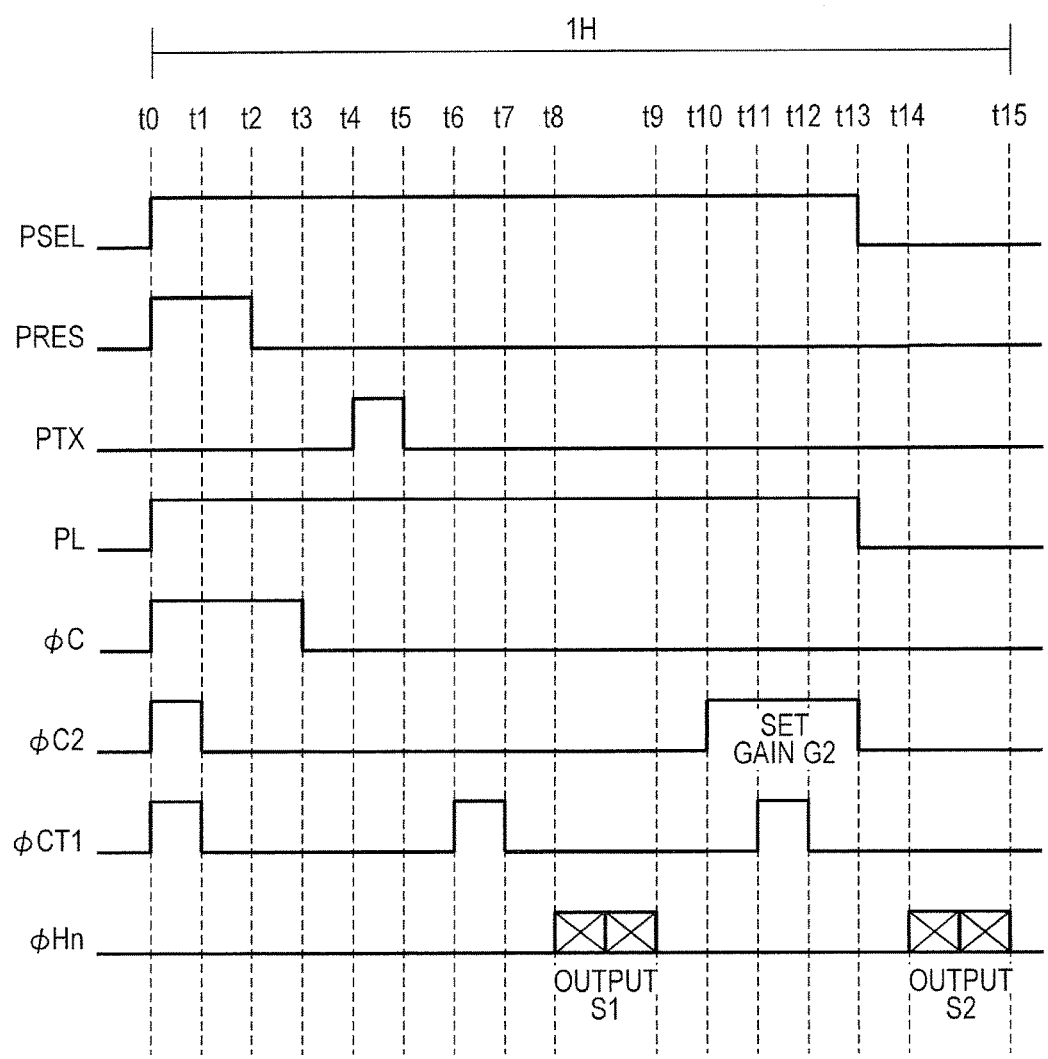
FIG. 6 is a timing chart for illustrating an example of the operation of the imaging apparatus according to the second embodiment.

FIG. 6 is a timing chart for illustrating the operation of the imaging apparatus of FIG. 5. The operation of the imaging apparatus according to this embodiment is described below with reference to the timing chart of FIG. 6, as well as FIG. 1 and FIG. 5.

At the time t0, the signal PTX output from the vertical scanning circuit 2 is at the L level. In other words, the transistor 20 is turned off, and the photoelectric converter 19 and the floating diffusion portion FD are not electrically connected to each other. The signal PRES output from the vertical scanning circuit 2 is at the H level. This resets the electric potential of the floating diffusion portion FD in each pixel 100. The signal PSEL output from the vertical scanning circuit 2 is also at the H level. The transistor 21 thus outputs a signal that is based on the reset electric potential of the floating diffusion portion FD to the relevant vertical signal line 6 via the transistor 22.

The signal PL that is output from the timing generator (not shown) at the time t0 is at the H level. The switch 8 becomes electrically connection state, with the result that a voltage of the vertical signal line 6 is input to the column amplifier 12 via the capacitor C0.

The signal ϕC and the signal ϕC2 are also at the H level. This connects the inverting input terminal and non-inverting output terminal of the column amplifier 12 to each other, and connects the non-inverting input terminal and inverting output terminal of the column amplifier 12 to each other. This also gives the same electric potential to the terminals of the capacitor C1 and the terminals of the capacitor C2, thereby resetting electric charges that have been accumulated in the capacitors C1 and C2.

A signal ϕCT1 is also at the H level. A capacitor CT1 of the horizontal transfer unit 4 is thus reset to an electric potential that is set with the output electric potential of the column amplifier 12 as a reference.

At the time t1, the signal ϕC2 output from the timing generator (not shown) changes to the L level, and the resetting of the electric potential of the capacitor C2 is cancelled. The capacitor C1 alone functions as the feedback capacitor of the column amplifier 12, and the gain of the column amplifier unit 3 is switched to G1 (sixteen in this embodiment).

The signal ϕCT1 also changes to the L level. This cancels the resetting of the capacitor CT1 as well.

At the time t2, the signal PRES changes to the L level. This cancels the resetting of the electric potential of the floating diffusion portion FD. The floating diffusion portion FD at this point holds an electric potential in which reset noise (kTC noise) is mixed. The pixel 100 and the reference pixel 101 each output a reset signal that is based on the electric potential held in the floating diffusion portion FD.

At the time t3, the signal φC changes to the L level. This cancels the resetting. An electric potential that is in relation to the reset signal is clamped to the capacitor C0 at this point.

The signal PTX changes to the H level at the time t4 and then changes to the L level at the time t5. This causes the transistor 20 to transfer electric charges that have been accumulated in the photoelectric converter 19 to the floating diffusion portion FD. The transistor 21 outputs an image signal that is based on the electric charges transferred to the floating diffusion portion FD to the vertical signal line 6 via the transistor 22. From the image signal output at this point, the reset signal has been subtracted by the first CDS circuit, which includes the capacitor C0, the column amplifier 12, the switch 11, and others.

The signal φCT1 changes to the H level at the time t6 and then changes to the L level at the time t7. This causes the capacitor CT1 to sample and hold the image signal output from the column amplifier 12.

In a period between the time t8 and the time t9, the horizontal scanning circuit 5 starts the operation of the signal φHn and executes horizontal scanning in which the switches 16 and 17 are switched on one column at a time. This causes the output amplifiers Samp1 and Samp2 to sequentially output, to the outside, signals each of which is the signal S1 that is based on a signal held in the capacitor CT1.

At the time t10, the signal φC2 changes to the H level. This causes the capacitors C1 and C2 both to function as the feedback capacitor of the column amplifier 12, and switches the gain of the column amplifier unit 3 to G2. The gain G2 in this embodiment is set to one. The image signal input to the column amplifier 12 remains the same and a difference in the signal output from the column amplifier 12 is therefore due to the switching of the gain of the column amplifier unit 3 from G1 to G2.

The signal φCT1 changes to the H level at the time t11 and then changes to the L level at the time t12. This causes the capacitor CT1 to sample and hold the signal S2 being an optical signal amplified at the gain G2 and output by the column amplifier 12.

At the time t13, the signal PSEL changes to the L level, and the pixel 100 and the reference pixel 101 are disconnected from the vertical signal line 6. The signal PL also changes to the L level at the time t13, thereby disconnecting the column amplifier 12 from the vertical signal line 6. The signal 4C2 changes to the L level at the time t13 as well, and the column amplifier 12 ceases the amplification operation.

In a period between the time t14 and the time t15, the horizontal scanning circuit 5 starts the operation of the signal φHn and executes horizontal scanning in which the switches 16 and 17 are switched on one column at a time. This causes the output amplifiers Samp1 and Samp2 to sequentially output, to the outside, signals each of which is the signal S2 that is based on a signal held in the capacitor CT1.

Unlike the first embodiment, the signals S1 and S2 are output as differential signals from the output amplifiers Samp1 and Samp2 in this embodiment. In other words, a difference between the output voltages of the output amplifiers Samp1 and Samp2 corresponds to an output signal.

From the signals S1 and S2 output in the manner described above, an output signal that has an expanded dynamic range and an improved S/N ratio can be obtained by the same method that is used in the first embodiment. The second embodiment is also reduced in number of times of resetting as in the first embodiment, and accordingly requires a shorter time to read signals, which speeds up the reading.

In addition, the second embodiment, where a fully-differential amplifier is used as the column amplifier 12, can provide an imaging apparatus that is high in CMRR and PSRR. Another effect of the second embodiment, where the column amplifier unit 3 has a highly symmetrical configuration, is that offset and noise caused by switches and capacitors that form the column amplifier unit 3 are reduced.

While the gain is varied in this embodiment by the switch 10 connected between the capacitor C1 and the capacitor C2 in the feedback capacitor, an individual switch may be provided for each capacitor as in the first embodiment. In the period from the time t8 to the time t9 where the signal S1 is output, the signal PSEL and the signal PL are at the H level in this embodiment. Alternatively, the signal S1 may be output after the column amplifier 12, the vertical signal line 6, and the pixel 100 are electrically disconnected by setting both or one of the signal PSEL and the signal PL to the L level.

Third Embodiment

An imaging apparatus according to a third embodiment of the present invention is described by focusing on differences from the second embodiment.

Figure 7:
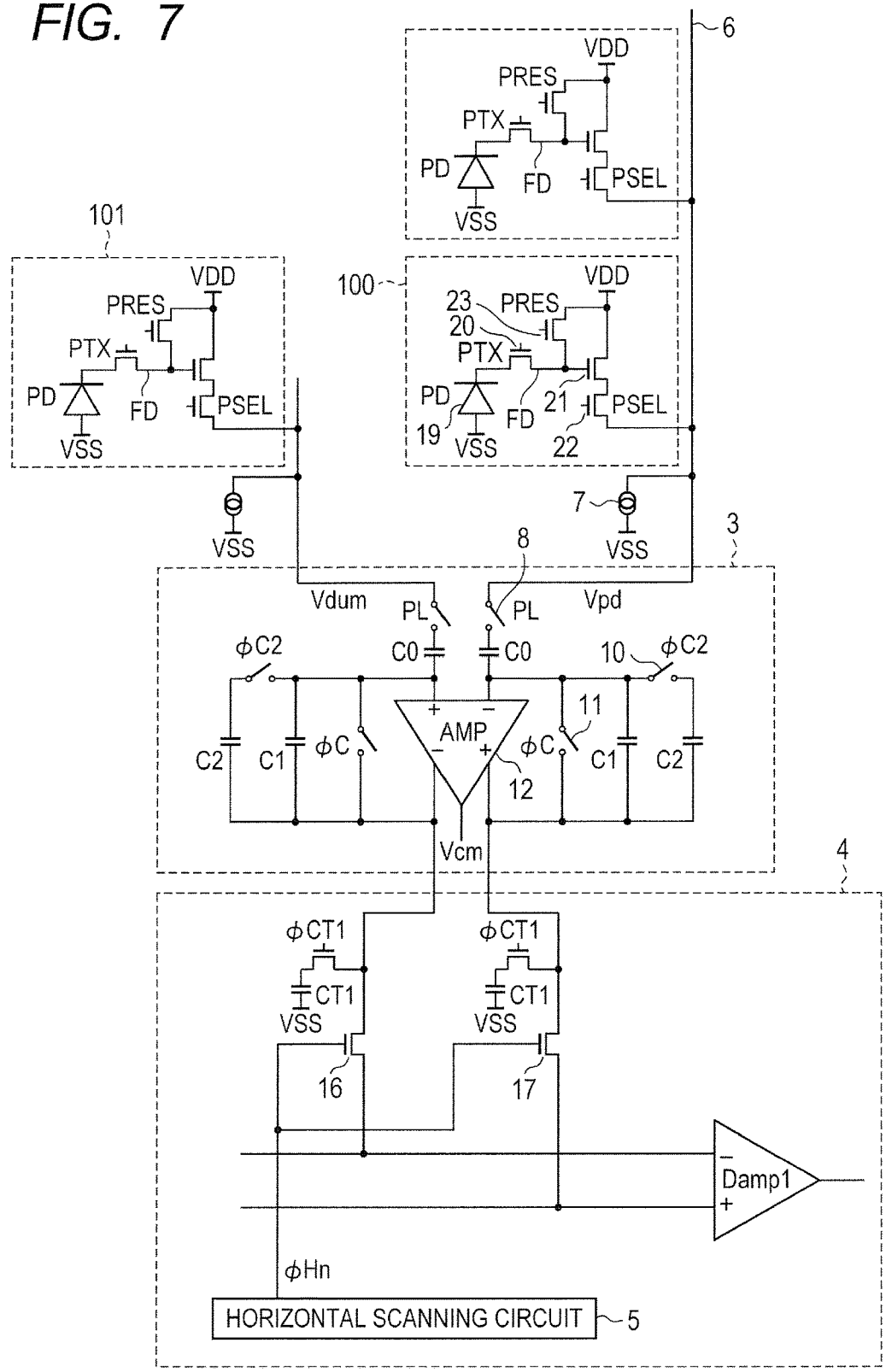
FIG. 7 is a diagram for illustrating an example of the configuration of an imaging apparatus according to a third embodiment of the present invention.

FIG. 7 is a diagram for illustrating the configuration of the imaging apparatus of this embodiment.

While the output amplifiers Samp1 and Samp2 are single-ended input/output amplifiers in the second embodiment, the output amplifier Damp1 in this embodiment is a differential input, single-ended output amplifier. This enables the imaging apparatus to output a signal that is obtained after converting the differential signal into a single-ended signal, which means that the number of output lines of the horizontal transfer unit 4 can be reduced from two to one.

According to the configuration of this embodiment, where the same effects as those in the second embodiment are obtained and, in addition, the number of output signal lines can be reduced, the imaging apparatus can be reduced in size.

Fourth Embodiment

Figure 8:
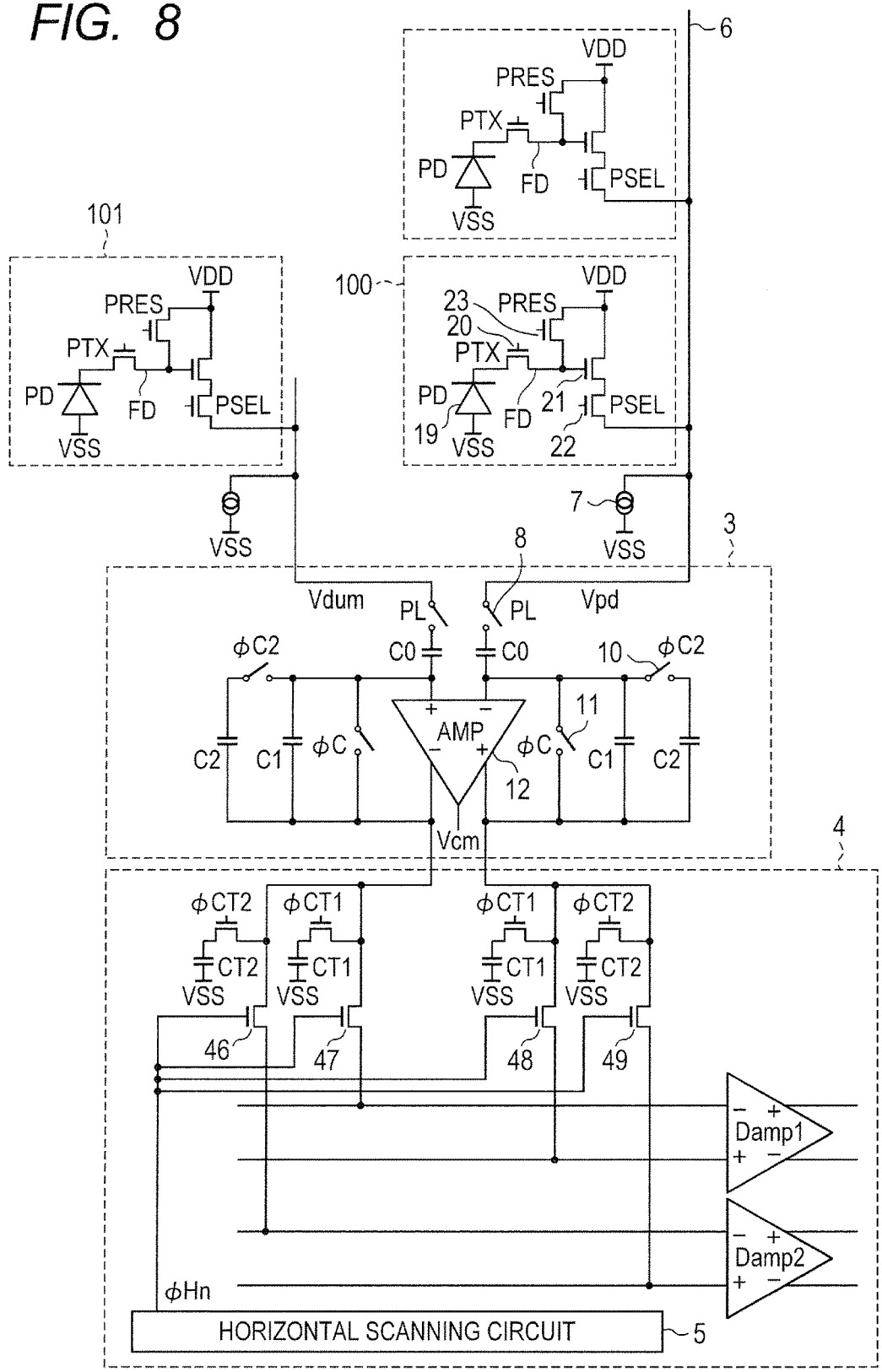
FIG. 8 is a diagram for illustrating an example of the configuration of an imaging apparatus according to a fourth embodiment of the present invention.

An imaging apparatus according to a fourth embodiment of the present invention is described by focusing on differences from the second embodiment. FIG. 8 is a diagram for illustrating the configuration of the imaging apparatus of this embodiment.

A pair of holding circuits each including the capacitor CT1 are disposed in the configuration of the second embodiment. In this embodiment, a pair of holding circuits each including the capacitor CT1 and a pair of holding circuits each including a capacitor CT2, two pairs of holding circuits in total, are disposed. The output amplifiers Damp1 and Damp2 that are differential input/output amplifiers are provided as amplifiers of the horizontal transfer unit 4, instead of the output amplifiers Samp1 and Samp2. Signals held in the capacitors CT1 are input to the output amplifier Damp1 via switches 47 and 48. Signals held in the capacitors CT2 are input to the output amplifier Damp2 via switches 46 and 49. In this manner, the signal S1 and the signal S2 are output from the horizontal transfer unit 4 in parallel to each other, thereby speeding up the operation of the imaging apparatus.

Figure 9:
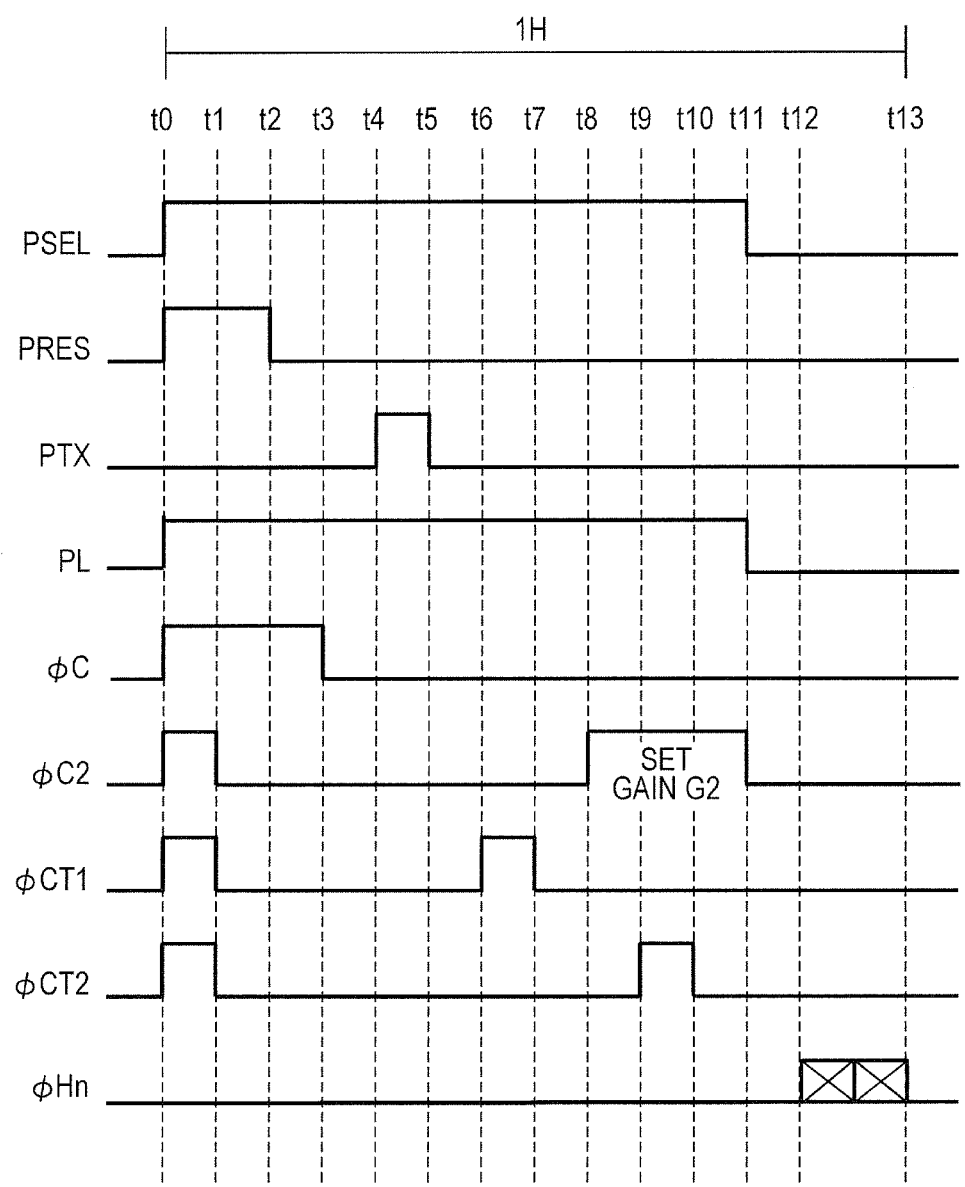
FIG. 9 is a timing chart for illustrating an example of the operation of the imaging apparatus according to the fourth embodiment.

FIG. 9 is a timing chart for illustrating the operation of the imaging apparatus of FIG. 8. The operation of the imaging apparatus according to this embodiment is described below with reference to the timing chart of FIG. 9, as well as FIG. 1 and FIG. 8. A description of the same operation as in the second embodiment is omitted.

At the time t0, the same operation as in the second embodiment is executed and, in addition, the timing generator (not shown) sets a signal φCT2 to the H level. The signal φCT2 then changes to the L level at the time t1. The capacitor CT2 is reset by this operation as is the capacitor CT1. The subsequent operation up through the time t7 is the same as in the second embodiment.

At the time t8, the signal φC2 changes to the H level and the gain of the column amplifier unit 3 switches from G1 to G2. The gain G2 is set to one in this embodiment.

The signal φCT2 changes to the H level at the time t9 and then changes to the L level at the time t10. This causes the capacitor CT2 to sample and hold the signal S2 being an image signal amplified at the gain G2 and output by the column amplifier 12.

At the time t11, the signal PSEL changes to the L level, and the pixel 100 and the reference pixel 101 are disconnected from the vertical signal line 6. The signal PL also changes to the L level at the time t11, thereby disconnecting the column amplifier 12 from the vertical signal line 6. The signal φC2 changes to the L level at the time t11 as well, and the column amplifier 12 ceases the amplification operation.

In a period between the time t12 and the time t13, the horizontal scanning circuit 5 starts the operation of the signal φHn and executes horizontal scanning in which the switches 46, 47, 48, and 49 are switched on one column at a time. This causes the output amplifiers Damp1 and Damp2 to sequentially output, to the outside, the signals S1 and S2 that are based on signals held in the capacitors CT1 and CT2.

From the signals S1 and S2 output in the manner described above, an output signal that has an expanded dynamic range and an improved S/N ratio can be obtained by the same method that is used in the first embodiment. The second embodiment requires a shorter time to read signals as in the first embodiment, which speeds up the reading.

Through the use of the configuration of this embodiment, the effects of the second embodiment are obtained and, in addition, the signal S1 and the signal S2 can be output to the outside in parallel to each other. The operation of the imaging apparatus can therefore be sped up further.

Fifth Embodiment

Figure 10:
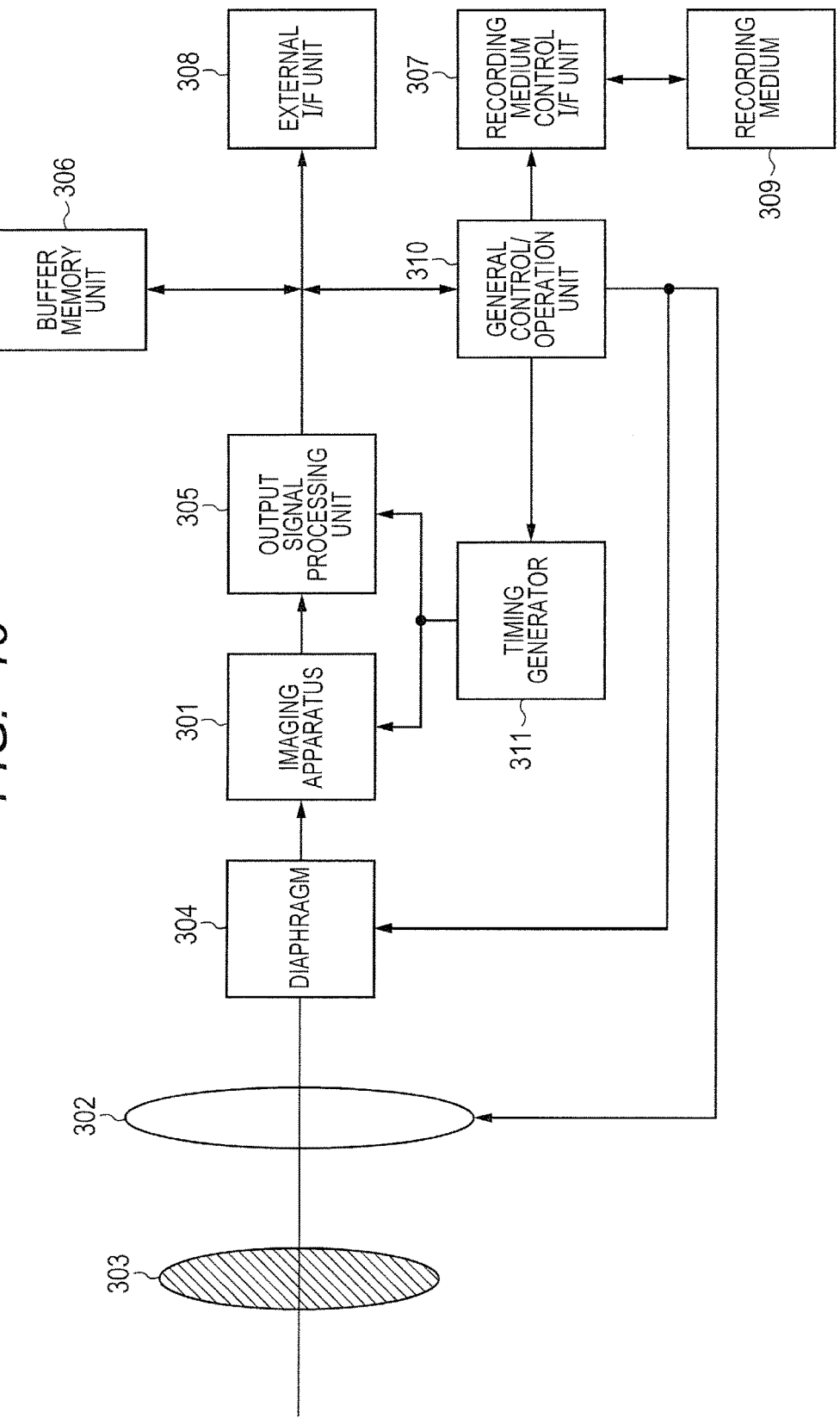
FIG. 10 is a diagram for illustrating an example of the configuration of an imaging system according to a fifth embodiment of the present invention.

A fifth embodiment of the present invention is described in which the imaging apparatus according to one of the first embodiment to the fourth embodiment is applied to an imaging system. The imaging system is an apparatus that uses the imaging apparatus to obtain an image, a video, or the like. Examples of the imaging system include a digital still camera, a digital camcorder, and a monitoring camera. FIG. 10 is a block diagram in which the imaging apparatus according to one of the first embodiment to the fourth embodiment is applied to a digital still camera as an example of the imaging system.

The imaging system in FIG. 10 includes a lens 302 for forming an optical image of a subject on an imaging apparatus 301, a barrier 303 for protecting the lens 302, and a diaphragm 304 for adjusting the quantity of light that has passed through the lens 302. The imaging system also includes an output signal processing unit 305 for processing an output signal that is output from the imaging apparatus 301.

The output signal processing unit 305 includes a digital signal processing unit to execute an operation of outputting a signal after performing, if necessary, various types of correction and compression on a signal that is output from the imaging apparatus 301. In the case where the signal output from the imaging apparatus 301 is an analog signal, the output signal processing unit 305 may have an analog-to-digital conversion circuit upstream of the digital signal processing unit. Processing executed in the digital signal processing unit may include the signal processing method described with reference to FIG. 4A, FIG. 4B, and FIG. 4C. Correction executed in the digital signal processing unit may include correction in which the value of digital data is multiplied by a constant number to change the luminance of the image, and may include correction in which the gray scale of the image is changed such as gamma correction.

The imaging system also includes a buffer memory unit 306, which temporarily stores image data, and a recording medium control interface (I/F) unit 307 for recording on a recording medium or reading a recording medium. The imaging system further includes a recording medium 309 such as a semiconductor memory, which is detachable, or built in the imaging system, to record or read imaging data. The imaging system further includes an external interface (I/F) unit 308 for holding communication to and from an external computer or the like, and a general control/operation unit 310 for performing various types of calculation and overall control of the digital still camera. The imaging system further includes a timing generator 311, which outputs various timing signals to the output signal processing unit 305. Control signals such as the timing signals may be input from the outside instead of from the timing generator 311. In other words, it is sufficient if the imaging system includes at least the imaging apparatus 301 and the output signal processing unit 305, which processes an output signal output from the imaging apparatus 301.

The imaging system of this embodiment can thus execute an imaging operation by applying the imaging apparatus 301, which is one of the imaging apparatus described in the first embodiment to the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165216, filed Aug. 14, 2014, which is hereby incorporated by reference herein in its entirety.

What is claimed is:
1. An imaging apparatus comprising:
a pixel configured to output pixel signals including a reset signal and an image signal;
a gain applying unit having an input node, and configured to apply a gain to the pixel signals; and
a holding unit configured to hold a signal output from the gain applying unit,
wherein in a first period, which is a period between beginning of inputting the reset signal to the input node and beginning of inputting the image signal input to the input node, the gain applying unit outputs at least one signal by applying the gain to the reset signal,
wherein in a second period, which is a period between beginning of inputting the image signal to the input node and ending of inputting the image signal input to the input node, the gain applying unit outputs gain applied signals which are different from each other in the gain applied, and wherein a number of the at least one signal output by the gain applying unit and held by the holding unit is smaller than a number of the gain applied signals output by the gain applying unit and held by the holding unit.

2. The imaging apparatus according to claim 1, wherein the ending of inputting the image signal to the input node is a timing of resetting the input node.

3. The imaging apparatus according to claim 2, wherein the gain applying unit is an amplifier unit that has the input node and an output node, and the resetting of the input node is performed by connecting the input node and the output node.

4. The imaging apparatus according to claim 1,
wherein the holding unit includes a plurality of holding circuits that holds the pixel signals, and
wherein a number of the holding circuits that holds the reset signal is smaller than a number of the holding circuits that holds the image signal.

5. The imaging apparatus according to claim 1, further comprising an output amplifier configured to output signals to an outside of the imaging apparatus,
wherein the output amplifier outputs a signal based on the image signal applied with the gain before being changed, and a signal based on the image signal applied with the gain after being changed.

6. The imaging apparatus according to claim 1, wherein, after the input node of the gain applying unit and the pixel are reset, the gain applying unit applies only a first gain to the reset signal, then applies the first gain to the image signal, and then applies a second gain smaller than the first gain to the image signal.

7. The imaging apparatus according to claim 6, wherein the input node of the gain applying unit is reset with the gain of the gain applying unit set to the first gain and, after the gain applying unit is reset, the gain is applied to the reset signal with the gain of the gain applying unit still set to the first gain.

8. The imaging apparatus according to claim 1, wherein the number of times the input node of the gain applying unit is reset during a period between the beginning of inputting the reset signal to the input node and the ending of inputting the image signal input to the input node is one.

9. The imaging apparatus according to claim 1, further comprising a reference pixel configured to output a reset signal,
wherein the gain applying unit comprises a fully-differential amplifier having differential input terminals and a differential output terminal, and
wherein the reset signal output from the reference pixel is input to a first terminal out of the differential input terminals of the fully-differential amplifier, and the image signal output from the pixel is input to a second terminal out of the differential input terminals of the fully-differential amplifier.

10. The imaging apparatus according to claim 9, wherein the imaging apparatus converts the differential signal output from the differential output terminal of the fully-differential amplifier into a single ended signal, and outputs the single-ended signal.

11. The imaging apparatus according to claim 9, further comprising a horizontal transfer unit, which comprises a plurality of holding circuits each configured to hold each of the plurality of image signals that are obtained by applying the plurality of gains and that are output from the differential output terminal of the fully-differential amplifier,
wherein the horizontal transfer unit outputs the plurality of image signals held in the plurality of holding circuits in parallel to one another.

12. An imaging system comprising:
the imaging apparatus according to claim 1; and
an output signal processing circuit configured to process a signal that is output from the imaging apparatus.

13. An imaging apparatus comprising:
a pixel configured to output pixel signals including a reset signal and an image signal;
a gain applying unit having an input node, and configured to apply a gain to the pixel signals; and
a plurality of holding circuits that holds the pixel signals,
wherein in a first period, which is a period between beginning of inputting the reset signal to the input node and beginning of inputting the image signal input to the input node, the gain is changed n times (where n is equal to or larger than 0),
wherein in a second period, which is a period between beginning of inputting the image signal to the input node and ending of inputting the image signal input to the input node, the gain is changed m times (where m is equal to or larger than 1),
wherein m is larger than n, and
wherein a number of at least one holding circuits that holds the reset signal is smaller than a number of the holding circuits that holds the image signal.

14. An imaging apparatus comprising:
a pixel configured to output pixel signals including a reset signal and an image signal;
a gain applying unit having an input node, and configured to apply a gain to the pixel signals; and
a holding unit configured to hold a signal output from the gain applying unit,
wherein in a first period, which is a period between beginning of inputting the reset signal to the input node and beginning of inputting the image signal input to the input node, the gain applying unit outputs at least one signal by applying the gain to the reset signal,
wherein in a second period, which is a period between beginning of inputting the image signal to the input node and ending of inputting the image signal input to the input node, the gain applying unit outputs gain applied signals which are different from each other in the gain applied,
wherein the holding unit includes a plurality of holding circuits that holds the pixel signals, and
wherein a number of at least one holding circuits that holds the reset signal is smaller than a number of the holding circuits that holds the image signal.

* * * * *